(12) United States Patent
Matsuo

(10) Patent No.: US 7,728,486 B2
(45) Date of Patent: Jun. 1, 2010

(54) ULTRASONIC SENSOR

(75) Inventor: Kenji Matsuo, Kanazawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 108 days.

(21) Appl. No.: 12/038,934

(22) Filed: Feb. 28, 2008

(65) Prior Publication Data

US 2008/0168841 A1    Jul. 17, 2008

Related U.S. Application Data

(63) Continuation of application No. PCT/JP2006/316555, filed on Aug. 24, 2006.

(30) Foreign Application Priority Data

Sep. 9, 2005    (JP) .............................. 2005-262743

(51) Int. Cl.
*H01L 41/053* (2006.01)
(52) U.S. Cl. ..................... 310/322; 310/334; 310/348
(58) Field of Classification Search ............... 310/322, 310/334, 335, 348; 73/584, 596, 632
See application file for complete search history.

(56) References Cited

U.S. PATENT DOCUMENTS

| | | | | |
|---|---|---|---|---|
| 4,326,274 A | * | 4/1982 | Hotta et al. ................. | 367/118 |
| 6,250,162 B1 | * | 6/2001 | Amaike et al. ............... | 73/642 |
| 6,520,019 B1 | | 2/2003 | Schön et al. | |
| 6,876,127 B2 | * | 4/2005 | Mitsuoka et al. ............ | 310/324 |
| 7,392,705 B2 | * | 7/2008 | Kawashima et al. .......... | 73/632 |
| 2007/0013014 A1 | * | 1/2007 | Guo et al. ................... | 257/417 |

FOREIGN PATENT DOCUMENTS

| | | |
|---|---|---|
| JP | 02-243100 A | 9/1990 |
| JP | 08-280095 A | 10/1996 |
| JP | 11-266498 A | 9/1999 |
| JP | 2000-332876 A | 11/2000 |
| JP | 2001-197592 A | 7/2001 |
| JP | 2004-015150 A | 1/2004 |
| JP | 2004-048223 A | 2/2004 |

OTHER PUBLICATIONS

Official communication issued in the International Application No. PCT/JP2006/316555, mailed on Nov. 28, 2006.

* cited by examiner

*Primary Examiner*—Walter Benson
*Assistant Examiner*—Derek J Rosenau
(74) *Attorney, Agent, or Firm*—Keating & Bennett, LLP

(57) ABSTRACT

An ultrasonic sensor includes a case having a substantially cylindrical shape with a bottom. The case has a piezoelectric element provided on the bottom, and a cushion member is engaged with a side portion of an opening of the case. A substrate and pin terminals are engaged in and held by a holding portion of the cushion member. On the substrate, electrodes that are connected to the pin terminals are provided. An opening portion is provided in a top surface of the cushion member. Lead wires that are electrically connected to the piezoelectric element extend out from the opening portion and are connected to the electrodes. The inside of the case is filled with an elastic resin from the opening portion.

13 Claims, 13 Drawing Sheets

ULTRASONIC SENSOR

BACKGROUND OF THE INVENTION

1. Field of the Invention

The present invention relates to ultrasonic sensors, and more particularly, to a ultrasonic sensor used, for example, for a back-up sensor on an automobile.

2. Description of the Related Art

FIG. 12 is a schematic diagram showing an example of a known ultrasonic sensor. An ultrasonic sensor 1 shown in FIG. 12 includes a case 2 having a substantially cylindrical shape with a bottom, the case 2 being formed of aluminum or other suitable material. One surface of a piezoelectric element 3 is bonded to an inner bottom surface of the case 2. The inside of the case 2 is substantially entirely filled with foamable resin 4, such as foamable silicon so as to cover the piezoelectric element 3. A substrate 6 having two terminals 5a and 5b is attached in an opening portion of the case 2 so as to cover the foamable resin 4. On opposed surfaces of the substrate 6, electrodes 7a and 7b are connected to the terminals 5a and 5b. The terminal 5a is connected to an opposite surface of the piezoelectric element 3 by the electrode 7a formed on the inner side of the substrate 6 and a wire 8. The terminal 5b is connected to the other surface of the piezoelectric element 3 by the electrode 7b formed on the outer side of the substrate 6 and solder 9 through the case 2.

Where a distance to an object to be detected is measured using the ultrasonic sensor 1 shown in FIG. 12, a driving voltage is applied to the terminals 5a and 5b to excite the piezoelectric element 3. As the piezoelectric element 3 is vibrated, the bottom surface of the case 2 is also vibrated, which causes an ultrasonic wave to be emitted in a direction perpendicular to the bottom surface as indicated by an arrow shown in FIG. 12. When the ultrasonic wave emitted from the ultrasonic sensor 1 is reflected by an object to be detected and reaches the ultrasonic sensor 1, the piezoelectric element 3 is vibrated and the vibration is converted into an electrical signal. The electrical signal is output from the terminals 5a and 5b. A period of time from the application of the driving voltage to the output of the electrical signal is measured, and thus, the distance from the ultrasonic sensor 1 to the object to be detected can be measured.

In the ultrasonic sensor 1 shown in FIG. 12, since the inside of the case 2 is filled with the foamable resin 4, the vibration of the overall case 2 is suppressed. Further, the ultrasonic wave generated in the inside of the case 2 is scattered and absorbed by a large number of foam pores in the foamable resin 4. This can efficiently suppress the vibration of the case 2 and the ultrasonic wave propagation within the case 2, thereby improving reverberation characteristics (see, for example, Japanese Unexamined Patent Application Publication No. 11-266498).

FIG. 13 is a schematic diagram showing another known ultrasonic sensor. An ultrasonic sensor 1 shown in FIG. 13 is different from the ultrasonic sensor 1 shown in FIG. 12, in that a substrate 6 having terminals 5a and 5b is not directly attached to a case 2, but instead, is covered with an elastic member 4a composed of silicon rubber or other suitable material which is filled in the inside of the case 2. A sealant 4b composed of a high-gas-barrier silicon material is provided on an exposed surface of the elastic member 4a. The terminal 5a is connected to a piezoelectric element 3 through a lead wire 8a, and the terminal 5b is connected to the piezoelectric element 3 through a lead wire 8b and the case 2.

In the ultrasonic sensor 1 shown in FIG. 13, the sealant 4b composed of a high-gas-barrier silicon material provided on the exposed surface of the elastic member 4a can effectively prevent corrosive gas from entering the case 2. Furthermore, the silicon material used as the sealant 4b can ensure a sufficient level of reverberation characteristics even in a cold temperature environment with rapid temperature changes (see, for example, Japanese Unexamined Patent Application Publication No. 2001-197592).

In the ultrasonic sensor 1 shown in FIG. 12, the substrate 6 having the terminals 5a and 5b is fixed in direct contact with a side surface of the case 2. Thus, the vibration of the piezoelectric element 3 is transmitted to the case 2 and the substrate 6 and is damped from the terminals 5a and 5b.

On the other hand, in the ultrasonic sensor 1 shown in FIG. 13, since the substrate 6 having the terminals 5a and 5b is covered with the elastic member 4a composed of silicon rubber or other suitable material which is filled in the inside of the case 2, vibration damping through the case 2 is less likely to occur.

However, in the ultrasonic sensor 1 shown in FIG. 13, the positions of the substrate 6 and the terminals 5a and 5b are often displaced by a filling process of silicon rubber or other suitable material used for the elastic member 4a, and it is difficult to position the terminals 5a and 5b at desired positions in the ultrasonic sensor. This may result in failure during mounting.

In the ultrasonic sensors 1 shown in FIGS. 12 and 13, the wire 8 and lead wires 8a and 8b inside the case 2 are bonded to the terminals 5a and 5b by soldering, welding, or other suitable method. However, due to the configuration of ultrasonic sensors 1 shown in FIGS. 12 and 13, the substrate 6, the case 2, and other components are assembled after the bonding. Thus, the length of the wire 8 and the lead wires 8a and 8b must be increased. Further, an excessive stress may be applied to the bonding portions of the wire 8 and the lead wires 8a and 8b when the case 2 and other components are assembled. Therefore, the wiring of the terminals 5a and 5b is very difficult.

SUMMARY OF THE INVENTION

To overcome the problems described above, preferred embodiments of the present invention provide an ultrasonic sensor which provides less damping of vibration of a piezoelectric element, allows easy positioning of terminals at desired positions, and allows easy connection between the piezoelectric element and the terminals.

An ultrasonic sensor according to a preferred embodiment of the present invention includes a case having a substantially cylindrical shape with a bottom, a piezoelectric element provided on an inner side of the bottom of the case, a cushion member engaged with a side portion of an opening of the case, a substrate engaged with the cushion member and secured by the cushion member, the substrate having a terminal fixed thereto, an electrode provided on the substrate and electrically connected to the terminal, and an opening portion provided in a top surface of the cushion member that communicates with the inside of the case and the electrode on the substrate.

The ultrasonic sensor according to this preferred embodiment of the present invention further includes, for example, a connection member, such as a lead wire or lead ribbon, that is electrically connected to the piezoelectric element, extends out from the opening portion, and is electrically connected to the electrode on the substrate, and a filler, such as foamable resin, that is injected into the inside of the case from the opening portion.

In the ultrasonic sensor according to this preferred embodiment of the present invention, an engagement structure is preferably provided by engaging the cushion member and the substrate having the terminal fixed thereto in a cantilever structure, and the opening portion is formed around the cantilever structure.

Preferably, a through-hole corresponding to the terminal is provided in the cushion member, and the terminal is inserted into the through-hole so that the substrate having the terminal fixed thereto is secured by the cushion member.

In the ultrasonic sensor according to this preferred embodiment of the present invention, a piezoelectric element is provided on a case, and a substrate having a terminal fixed thereto is secured by a cushion member engaged with the case. Thus, the substrate is not in direct contact with the case, the vibration of the piezoelectric element is buffered by the cushion member and is transmitted to a lesser extent to the terminal, which results in less damping.

In the ultrasonic sensor according to a preferred embodiment of the present invention, furthermore, the substrate having the terminal fixed thereto is held by the cushion member engaged with the case. Therefore, the terminal can be easily positioned at a desired position.

Preferably, an opening portion communicating with the inside of the case and an electrode on the substrate is provided in a top surface of the cushion member. Therefore, for example, a connection member, such as a lead wire or lead ribbon, to be electrically connected to the piezoelectric element is extended out from the opening portion and can be easily electrically connected to the electrode on the substrate. Thus, the piezoelectric element and the terminal can be easily connected.

In the ultrasonic sensor according to this preferred embodiment of the present invention, a filler having elasticity, such as foamable resin, is preferably filled in the inside of the case from the opening portion, thereby suppressing the vibration of the overall case.

In addition, in the ultrasonic sensor according to this preferred embodiment of the present invention, an engagement structure provided by engaging the cushion member and the substrate having the terminal fixed thereto is preferably a cantilever structure, and the opening portion is provided around the cantilever structure. Therefore, a large opening portion can be provided, which facilitates connection of the piezoelectric element and the terminal and filling of the filler.

In the ultrasonic sensor according to this preferred embodiment of the present invention, the cushion member preferably includes a through-hole therein which corresponds to the terminal, and the terminal is inserted into the through-hole so that the substrate having the terminal fixed thereto is secured by the cushion member. Therefore, the terminal is directly secured by the cushion member, and the terminal can be easily positioned at a desired position.

According to preferred embodiments of the present invention, an ultrasonic sensor which provides less damping of vibration of a piezoelectric element, allows easy positioning of terminals at desired positions, and allows easy connection between the piezoelectric elements and the terminals is obtained.

Other features, elements, processes, steps, characteristics and advantages of the present invention will become more apparent from the following detailed description of preferred embodiments of the present invention with reference to the attached drawings.

BRIEF DESCRIPTION OF THE PREFERRED EMBODIMENTS

DETAILED DESCRIPTION OF THE PREFERRED EMBODIMENTS

Figure 1:
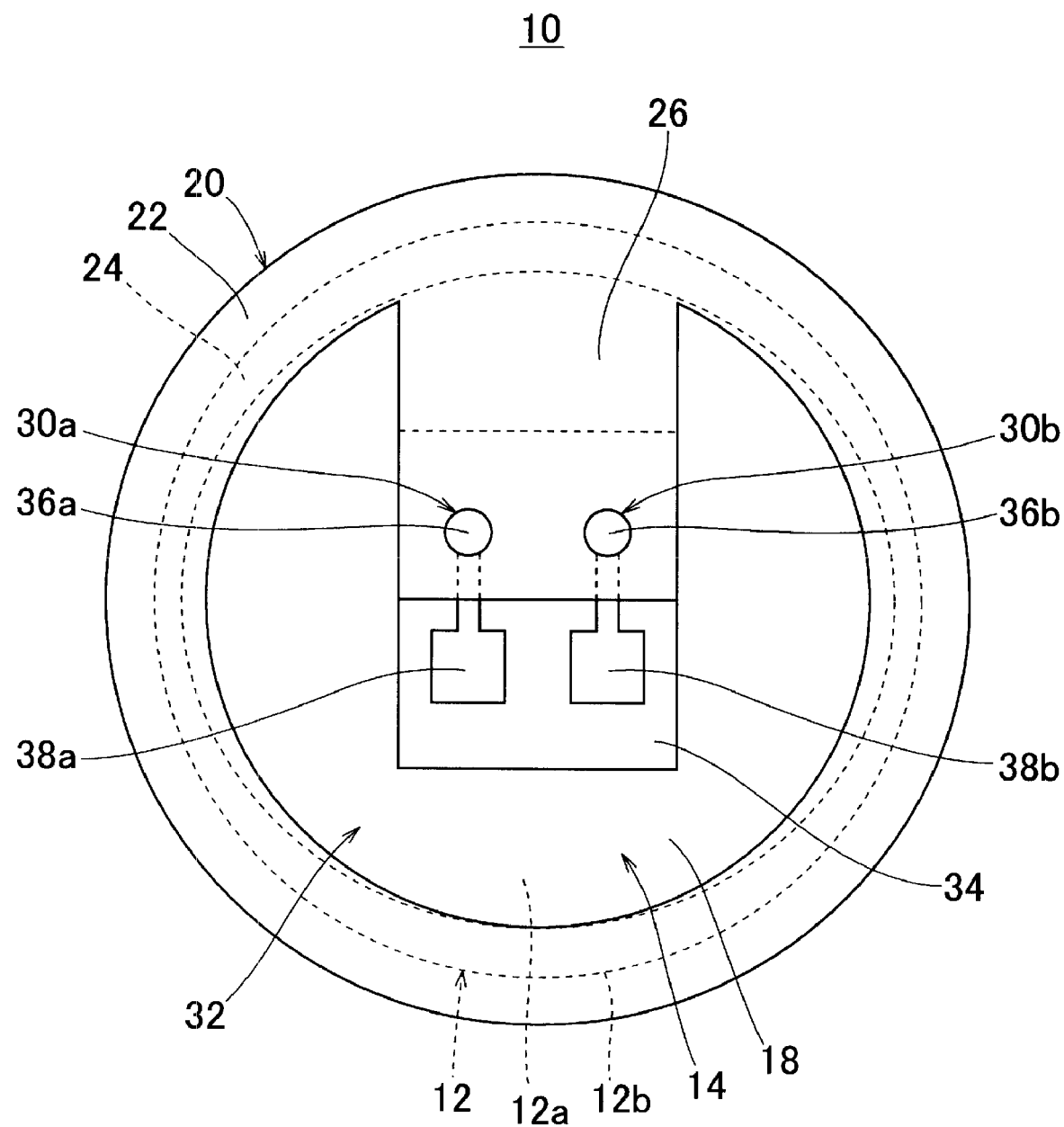
FIG. 1 is a schematic plan view showing an ultrasonic sensor according to a preferred embodiment of the present invention.
Figure 2:
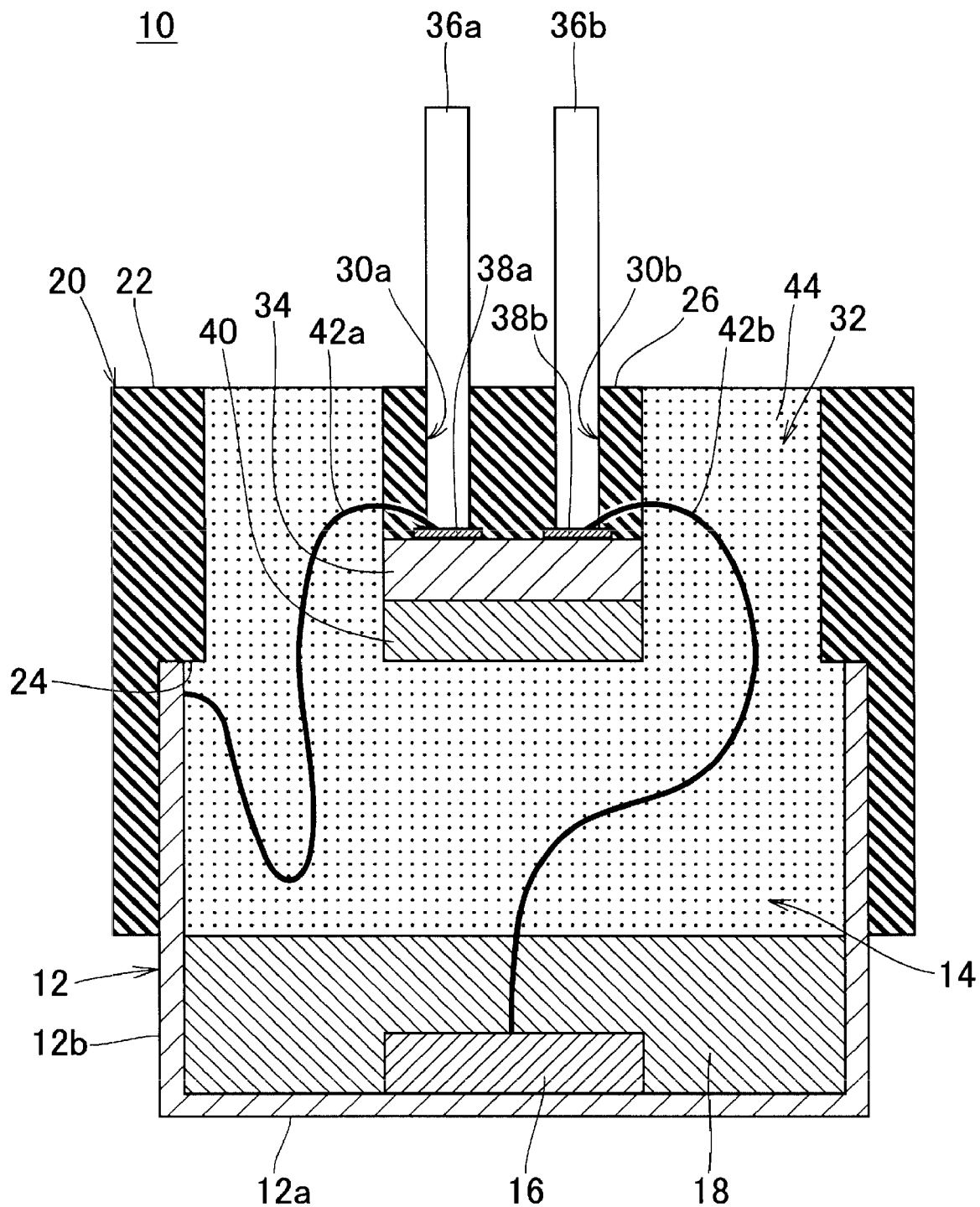
FIG. 2 is a schematic front view of the ultrasonic sensor shown in FIG. 1.
Figure 3:
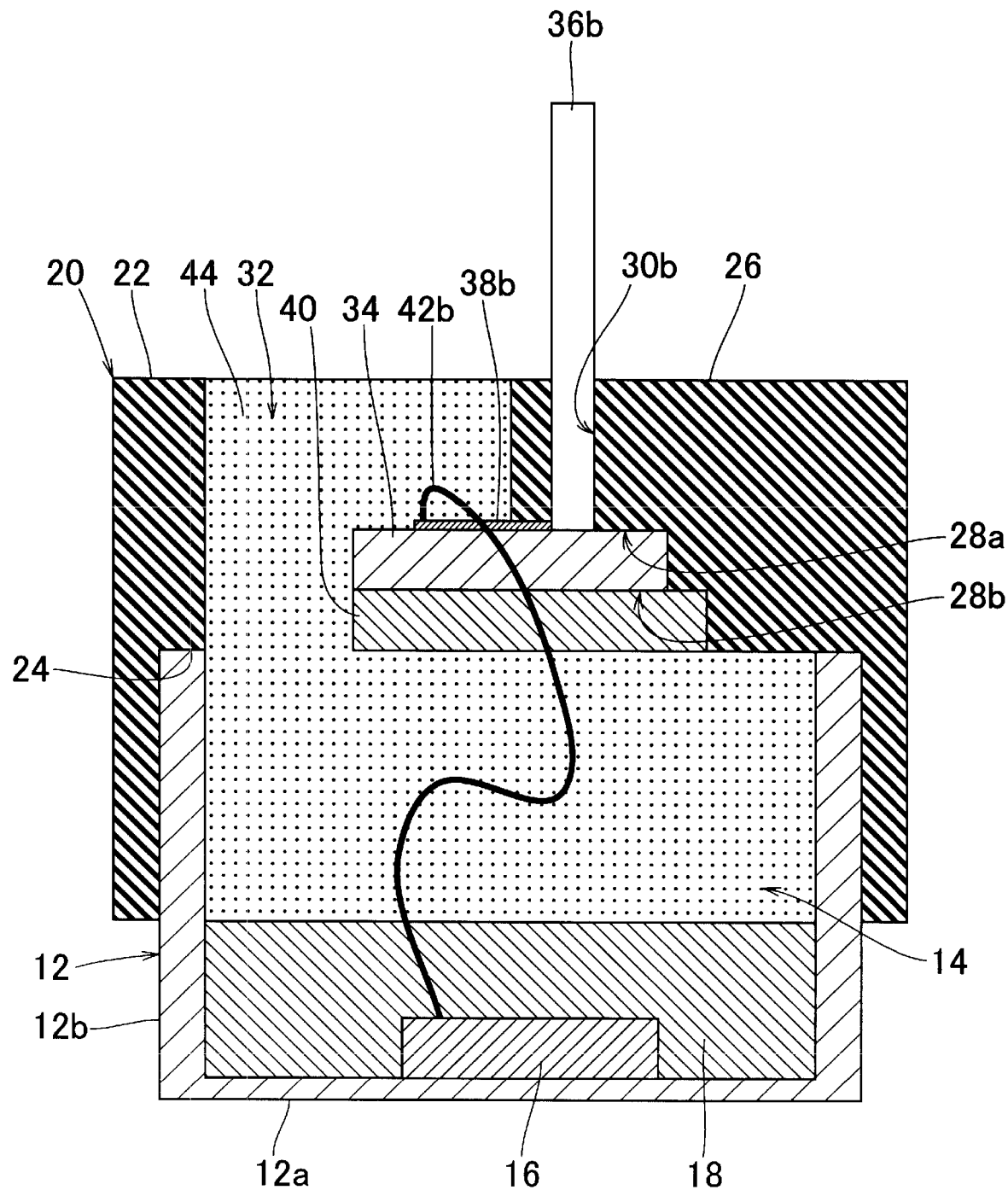
FIG. 3 is a schematic side view of the ultrasonic sensor shown in FIG. 1.
Figure 4:
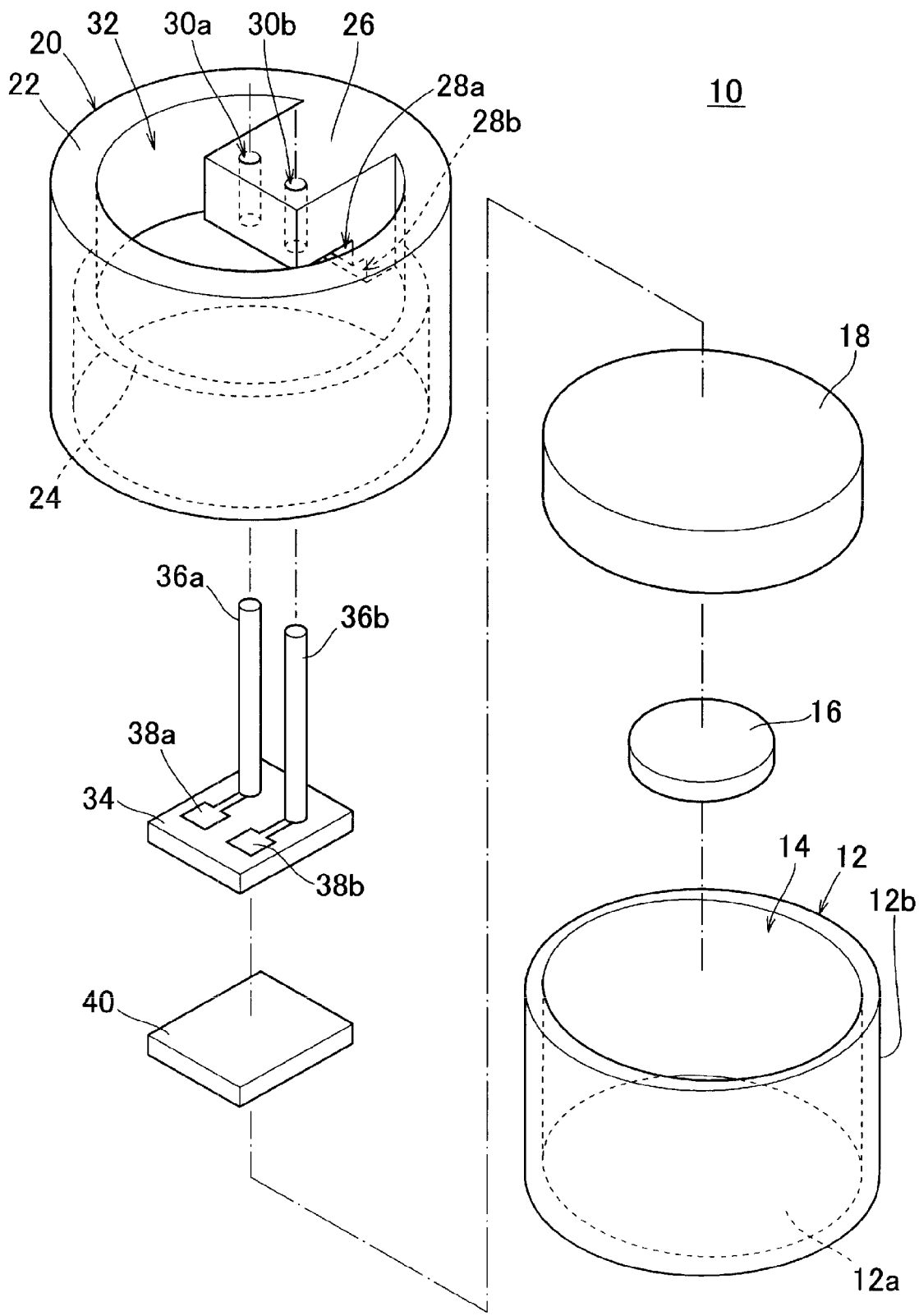
FIG. 4 is an exploded perspective view of the ultrasonic sensor shown in FIG. 1.

FIG. 1 is a schematic plan view showing an ultrasonic sensor according to a preferred embodiment of the present invention. FIG. 2 is a schematic front view of the ultrasonic sensor. FIG. 3 is a schematic side view of the ultrasonic sensor. FIG. 4 is an exploded perspective view of the ultrasonic sensor. In FIGS. 1 and 4, foamable resin filled in the inside of a case and lead wires for electrical connection are not shown.

An ultrasonic sensor 10 shown in FIG. 1 includes a case 12 having, for example, a substantially cylindrical shape with a bottom. The case 12 includes a bottom surface portion 12a and a sidewall 12b. The case 12 is made of a metal material, such as aluminum. As shown in FIGS. 1 and 4, a hollow portion 14 inside the case 12 has a substantially elliptical cross-section. Therefore, the case 12 includes a set of opposing portions of the sidewall 12b that have a smaller wall thickness and a set of opposing portions perpendicular thereto that have a greater wall thickness. Since the radiation range of the ultrasonic wave emitted from the ultrasonic sensor 10 is determined by the shape of the hollow portion 14, the shape of the hollow portion 14 is designed according to desired characteristics.

Inside the case 12, a piezoelectric element 16 is mounted on an inner surface of the bottom surface portion 12a. The piezoelectric element 16 includes electrodes on both surfaces of a piezoelectric substrate having a disk shape, for example. The electrode provided on one of the surfaces of the piezoelectric element 16 is attached to the bottom surface portion 12a by an electrically conductive adhesive or other suitable adhesive. A sound-absorbing member 18 made of, for example, felt is attached to the electrode on the other surface side of the piezoelectric element 16 by an adhesive. The sound-absorbing member 18 absorbs the ultrasonic wave propagating from the piezoelectric element 16 to the inside of the case 12, and does not prevent the vibration of the piezoelectric element 16 due to an elastic resin 44 described below.

A cushion member 20 made of, for example, silicon rubber is engaged with in a side portion of an opening of the case 12. The cushion member 20 functions to prevent unwanted vibration from propagating from the case 12 to the outside and to prevent unwanted vibration from entering the case 12 from the outside, and is used as a buffer. The cushion member 20 includes a substantially cylindrical attachment portion 22. The attachment portion 22 is attached to the case 12, and includes a step portion 24 at the inside center thereof in the height direction so that the inner diameter of the upper half portion in the height direction is less than the outer diameter of the case 12 while the inner diameter of the lower half portion in the height direction is substantially the same as the outer diameter of the case 12. The lower half portion of the attachment portion 22 is engaged with the side portion of the opening of the case 12, whereby the attachment portion 22 can be attached to the case 12.

A holding portion 26 having, for example, a substantially rectangular parallelepiped shape is integrally formed with the attachment portion 22 so as to extend from an upper portion of the attachment portion 22 to the center of the attachment portion 22. The holding portion 26 holds a substrate 34 and pin terminals 36a and 36b described below. The holding portion 26 has a recess portion 28a in a lower portion thereof into which a portion of the substrate 34 described below is engaged and a recess portion 28b into which a portion of a sound-absorbing member 40 described below is engaged. The recess portions 28a and 28b are arranged in a step-like arrangement. The recess portion 28a is provided on the leading end side of the holding portion 26, and the recess portion 28b is provided below the recess portion 28a so as to extend toward the attachment portion 22 with respect to the recess portion 28a. The holding portion 26 further includes, at substantially the center of the cushion member 20, two through-holes 30a and 30b extending in the longitudinal direction so that the through-holes 30a and 30b are spaced apart from each other in the width direction of the holding portion 26. The pin terminals 36a and 36b described below are inserted through the through-holes 30a and 30b. The through-holes 30a and 30b are arranged to correspond to the pin terminals 36a and 36b, respectively.

The cushion member 20 further includes a substantially C-shaped opening portion 32 in a top surface thereof inside the attachment portion 22 and outside the holding portion 26, that is, around a cantilever structure of the holding portion 26. The opening portion 32 is used to electrically connect lead wires 42a and 42b to electrodes 38a and 38b described below or to fill the elastic resin 44 in the inside of the case 12, and is arranged so as to communicate with the inside of the case 12 and with the electrodes 38a and 38b on the substrate 34 described below.

The substrate 34 and the pin terminals 36a and 36b are engaged with and secured by the holding portion 26 of the cushion member 20. The substrate 34 is, for example, a substantially rectangular glass epoxy substrate, and the two pin terminals 36a and 36b are pressed into and fixed to the substrate 34 so as to be spaced apart from each other in a width direction of the substrate 34. On a top surface of the substrate 34, the two electrodes 38a and 38b are arranged so as to be spaced apart from each other in the width direction of the substrate 34. The electrodes 38a and 38b are electrically connected to the pin terminals 36a and 36b, respectively.

The pin terminals 36a and 36b are inserted into the through-holes 30a and 30b of the holding portion 26 from below, respectively, and a portion of the substrate 34 is engaged in the recess portion 28a of the holding portion 26. Thus, the substrate 34 and the pin terminals 36a and 36b are secured by the holding portion 26 of the cushion member 20. In this case, an engagement structure provided by engaging the holding portion 26 of the cushion member 20 with the substrate 34 and the pin terminals 36a and 36b is a cantilever structure, and the pin terminals 36a and 36b are located substantially at the center of the cushion member 20.

A sound-absorbing member 40 having a substantially rectangular plate shape made of, for example, felt is adhered to a lower surface of the substrate 34 by an adhesive, and a portion of the sound-absorbing member 40 is engaged in the recess portion 28b of the holding portion 26. The sound-absorbing member 40 is used to absorb the ultrasonic waves propagating from the substrate 34 to the inside of the case 12.

One end of the lead wire 42a made of, for example, a polyurethane copper wire, which is used as a connection member, is connected to an inner surface of the sidewall 12b of the case 12. The lead wire 42a is therefore electrically connected to the electrode on the one surface side of the piezoelectric element 16 through the case 12. The other end of the lead wire 42a extends out from the opening portion 32, and is connected to the electrode 38a on the substrate 34. Thus, the electrode on the one surface side of the piezoelectric element 16 is electrically connected to the pin terminal 36a through the case 12, the lead wire 42a, and the electrode 38a.

One end of the lead wire 42b made of, for example, a polyurethane copper wire, which is used as a connection member, is connected to the electrode on the other surface side of the piezoelectric element 16. The other end of the lead wire 42b extends out from the opening portion 32, and is connected to the electrode 38b on the substrate 34. Thus, the electrode on the other surface side of the piezoelectric element 16 is electrically connected to the pin terminal 36b through the lead wire 42b and the electrode 38b.

The elastic resin 44 made of, for example, foamable silicon or other suitable material is injected from the opening portion 32 and is filled as a filler in the inside of the case 12 and the opening portion 32 of the cushion member 20.

Next, an example of a method of manufacturing the ultrasonic sensor 10 will be described.

Figure 5:
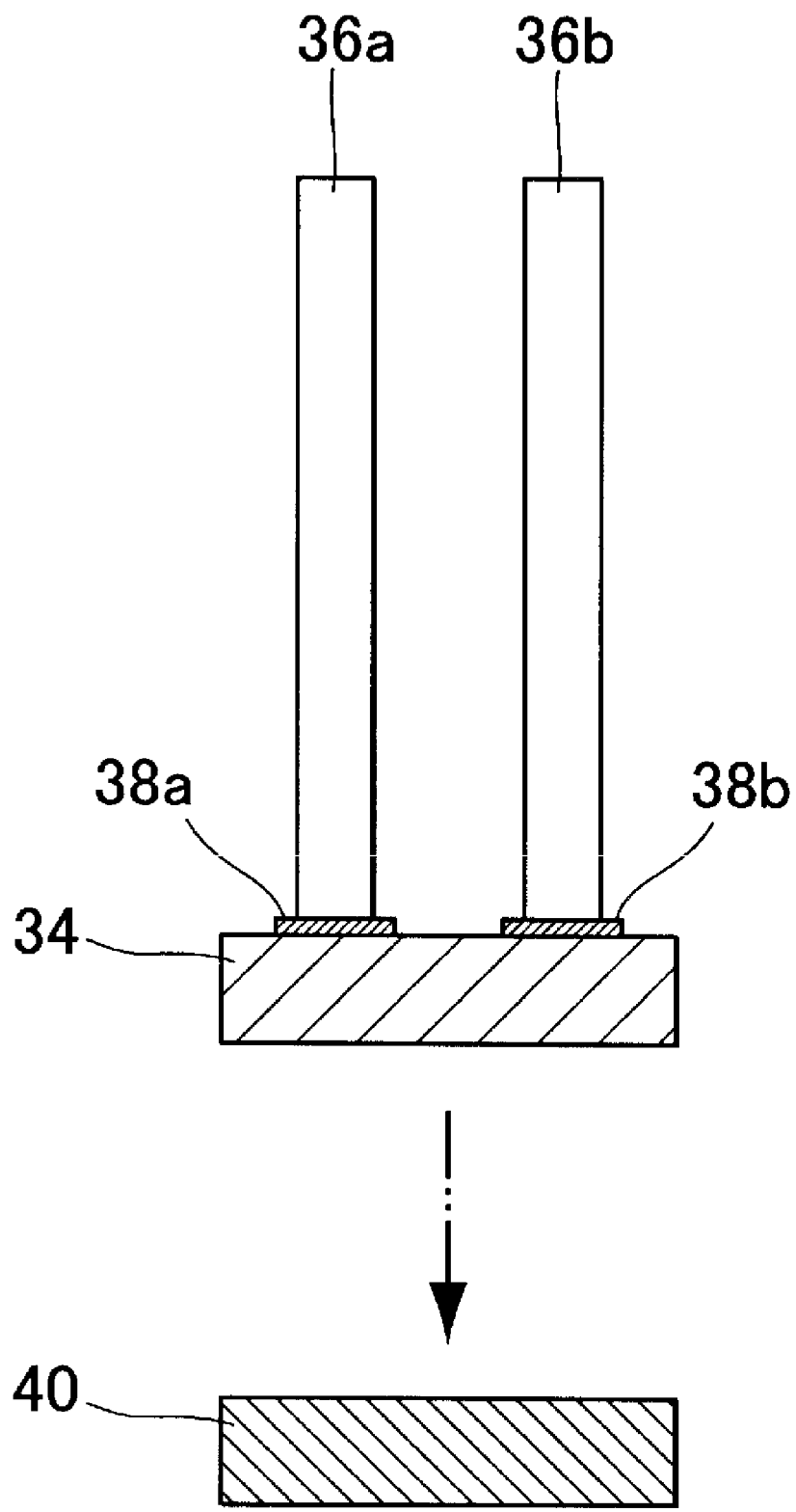
FIG. 5 is a schematic diagram showing a substrate into which pin terminals are pressed which are used in the ultrasonic sensor shown in FIG. 1.

First, as shown in FIG. 5, the substrate 34 made of a glass epoxy substrate having the electrodes 38a and 38b printed on the top surface thereof and electrically connected to the electrodes 38a and 38b by pressing the pin terminals 36a and 36b into the through-holes is prepared. Then, the sound-absorbing member 40 made of felt is attached to the lower surface of the substrate 34 by an adhesive.

Figure 6:
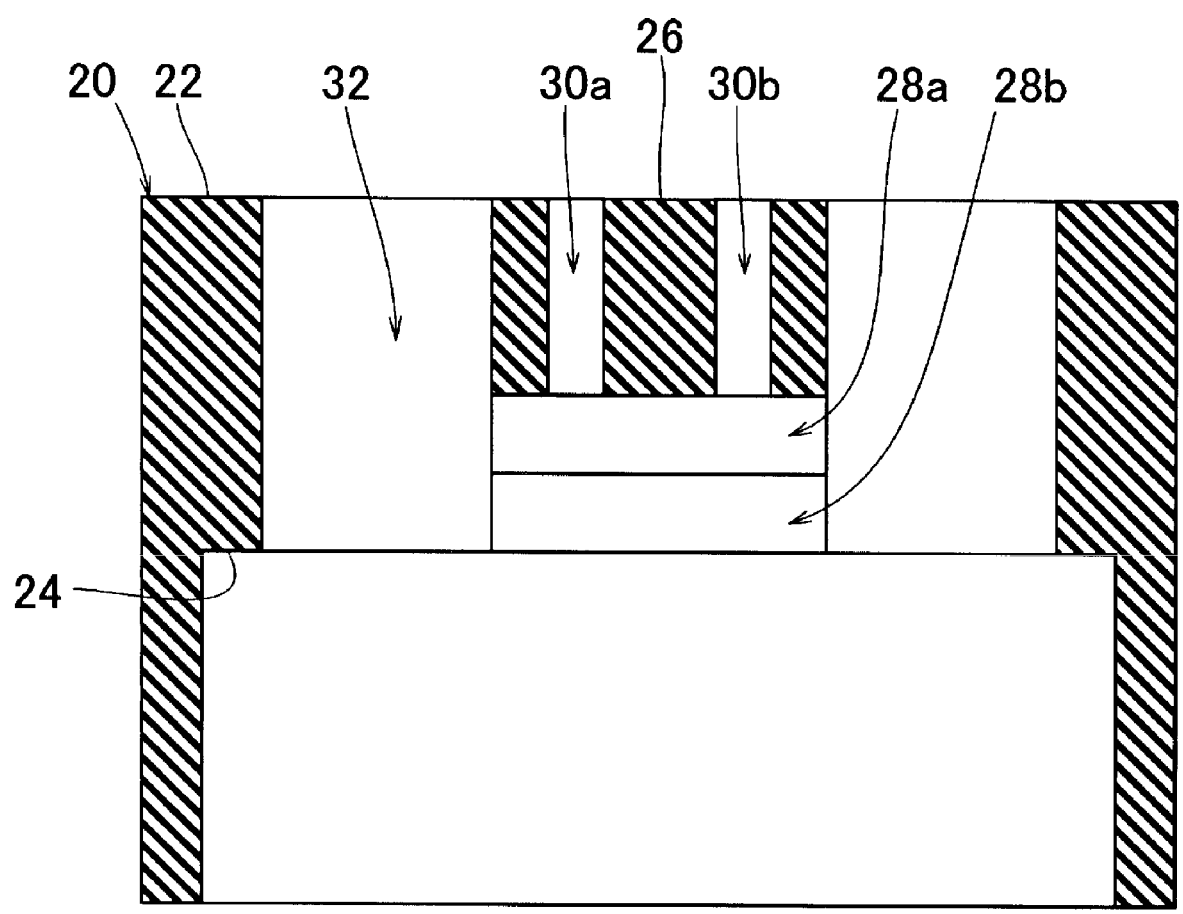
FIG. 6 is a schematic diagram showing a cushion member used in the ultrasonic sensor shown in FIG. 1.

Further, as shown in FIG. 6, the cushion member 20 made of silicon rubber having the attachment portion 22 and the holding portion 26 is formed.

Figure 7:
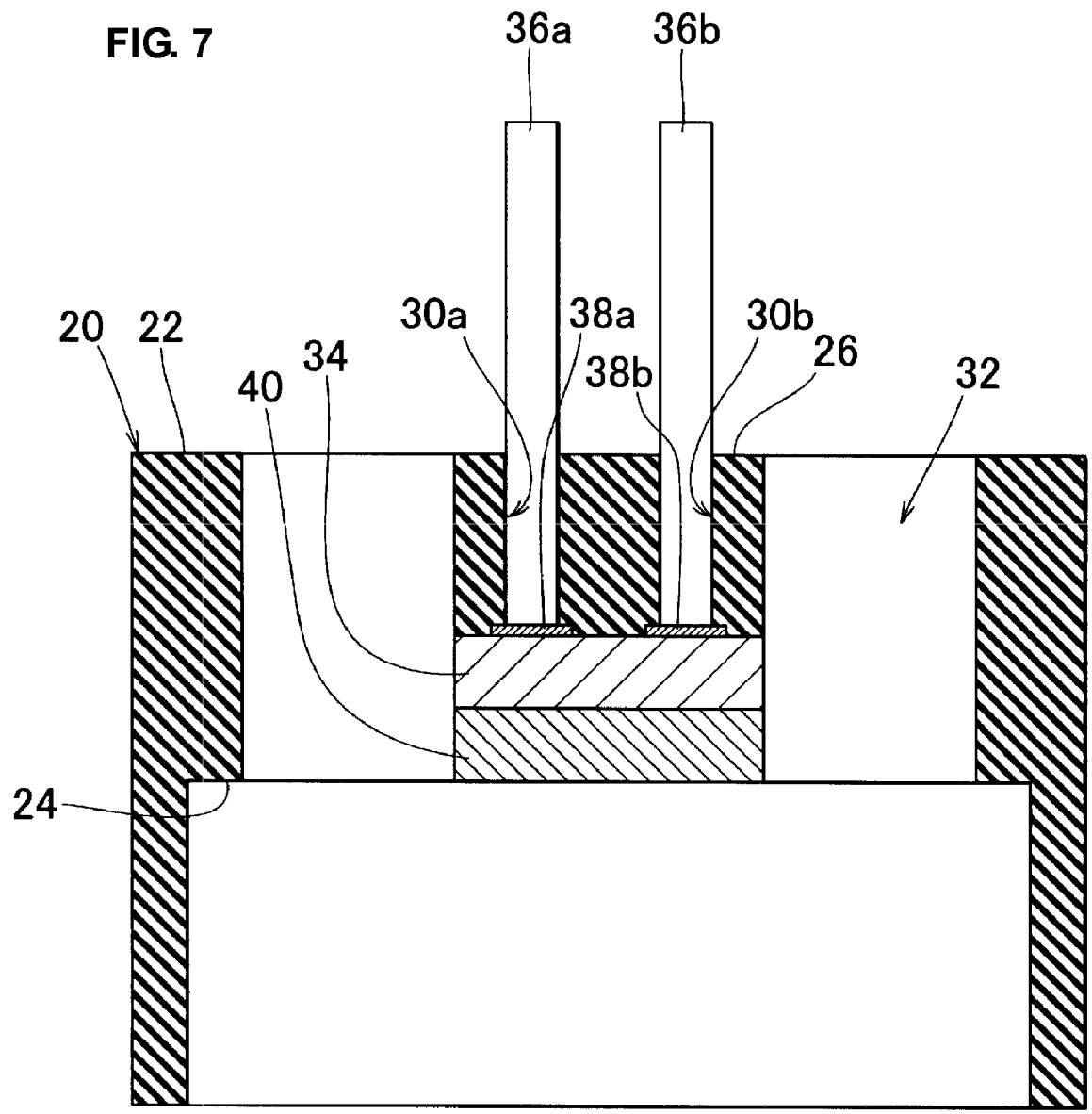
FIG. 7 is a schematic diagram showing a state in which the pin terminals shown in FIG. 5 are engaged in the cushion member shown in FIG. 6.

Then, as shown in FIG. 7, the pin terminals 36a and 36b are inserted into the through-holes 30a and 30b in the holding portion 26 of the cushion member 20, respectively. Further, a portion of the substrate 34 and a portion of the sound-absorbing member 40 are engaged in the recess portions 28a and 28b formed in the holding portion 26, respectively. Thus, the substrate 34 and the pin terminals 36a and 36b are engaged with the holding portion 26 of the cushion member 20 and are secured by the holding portion 26.

Figure 8:
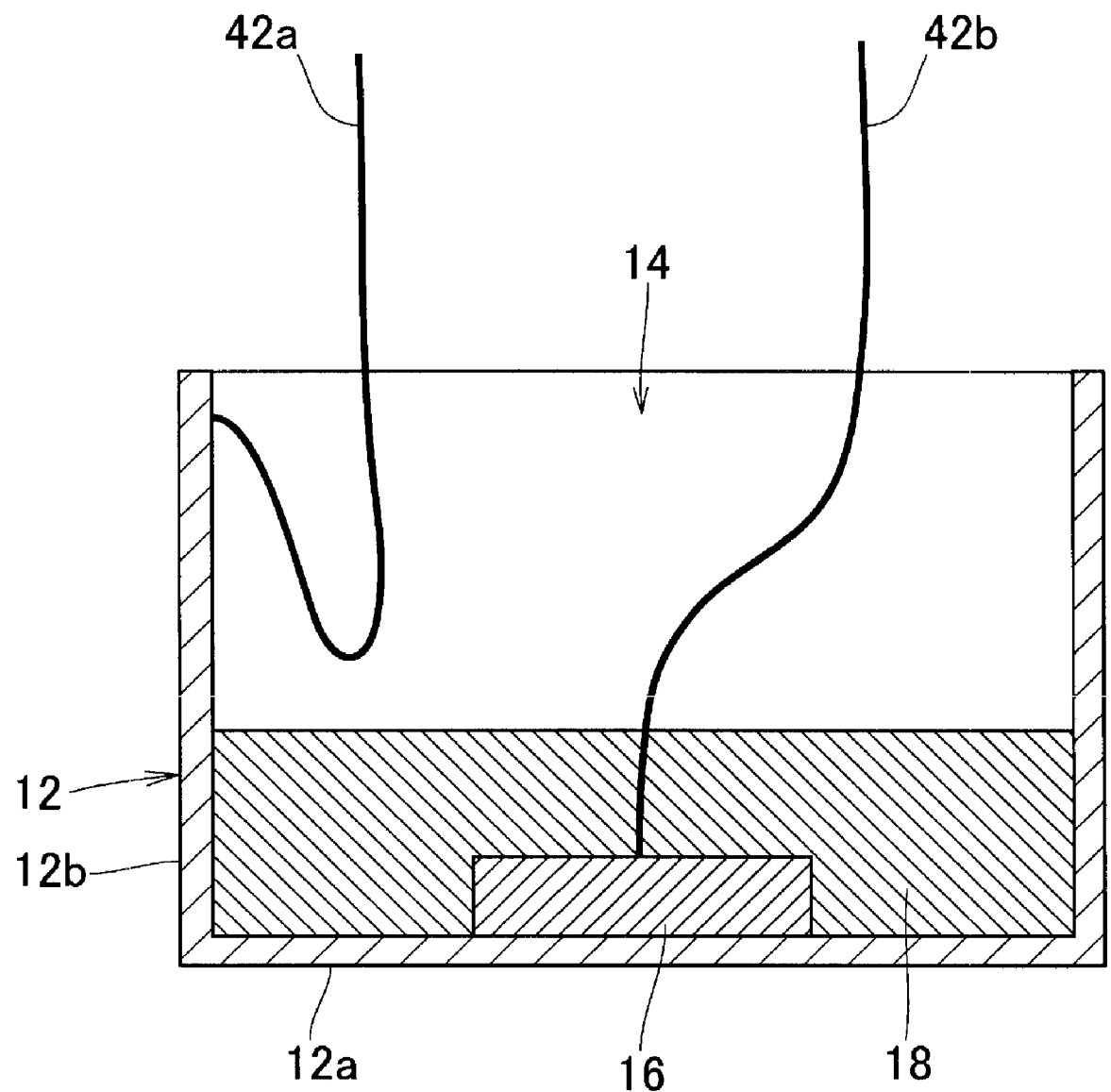
FIG. 8 is a schematic diagram showing a case, a piezoelectric element, and other components of the ultrasonic sensor shown in FIG. 1.

Further, as shown in FIG. 8, the case 12 is prepared, and the electrode on the one surface side of the piezoelectric element 16 is attached to the inner surface of the bottom surface portion 12a of the case 12 by an electrically conductive adhesive. One end of the lead wire 42a made of a polyurethane copper wire is soldered to the inner surface of the sidewall 12b of the case 12, and one end of the lead wire 42b made of a polyurethane copper wire is soldered to the electrode on the other surface side of the piezoelectric element 16. Inside the case 12, the sound-absorbing member 18 made of felt is attached to the electrode on the other surface side of the piezoelectric element 16 by an adhesive.

Then, as shown in FIGS. 2 and 3, the attachment portion 22 of the cushion member 20 is engaged with the side portion of the opening of the case 12. The other end of the lead wire 42a extends out from the opening portion 32 and is soldered to the electrode 38a. Further, the other end of the lead wire 42b extends out from the opening portion 32 and is soldered to the electrode 38b.

Then, the inside of the case 12 and the opening portion 32 of the cushion member 20 are filled with the elastic resin 44, such as foamable silicon, as a filler. In this case, unfoamed resin is injected into the inside of the case 12 from the opening portion 32 of the cushion member 20, and is heated, foamed, and cured to fill the opening 32. Therefore, the ultrasonic sensor 10 is manufactured.

Where the ultrasonic sensor 10 is used as, for example, a back-up sensor or other suitable sensor on an automobile, the piezoelectric element 16 is excited by applying a driving voltage to the pin terminals 36a and 36b. Even if the surrounding of the piezoelectric element 16 is covered with the elastic resin 44, the sound-absorbing member 18 adhered to the piezoelectric element 16 ensures a vibration range of the piezoelectric element 16. As the piezoelectric element 16 is vibrated, the bottom surface portion 12a of the case 12 is also vibrated, which causes an ultrasonic wave to be emitted in a direction perpendicular to the bottom surface portion 12a. When the ultrasonic wave emitted from the ultrasonic sensor 10 is reflected by an object to be detected and reaches the ultrasonic sensor 10, the piezoelectric element 16 is vibrated and the vibration is converted into an electrical signal. The electrical signal is output from the pin terminals 36a and 36b. A period of time from the application of the driving voltage to the output of the electrical signal is measured, and thus, the distance from the ultrasonic sensor 10 to the object to be detected can be measured.

In the ultrasonic sensor 10, since the inside of the case 12 is filled with the elastic resin 44, the vibration of the overall case 12 is suppressed.

Furthermore, in the ultrasonic sensor 10, vibration interference between the case 12 and the pin terminals 36a and 36b, such as the propagation of vibration from the case 12 to the pin terminals 36a and 36b, is reduced or prevented by the sound-absorbing member 18, the cushion member 20, the sound-absorbing member 40, and the elastic resin 44. Thus, the effect of a vibration leakage signal on a reverberation signal or received signal when an object is detected is suppressed. In other words, no deterioration of reverberation characteristics due to vibration leakage occurs. In addition, the effect of propagation of unwanted vibration from the outside through the pin terminals 36a and 36b is suppressed.

In the ultrasonic sensor 10, the pin terminals 36a and 36b are inserted into and engaged in the through-holes 30a and 30b provided in the cushion member 20 engaged with the case 12. Thus, the positioning accuracy of the pin terminals 30a and 30b with respect to the case 12 is significantly improved. That is, since the bottom portions of the pin terminals 36a and 36b mate with the through-holes 30a and 30b provided in the cushion member 20 and a center portion of the case 12 is aligned with a center portion of the cushion member 20, a high positional accuracy of the pin terminals 36a and 36b with respect to the case 12 is obtained.

In addition, in the ultrasonic sensor 10, the case 12, the cushion member 20, the substrate 34, and the pin terminals 36a and 36b can be easily assembled with high positional accuracy by engagement without using an adhesive or a special positioning tool.

In the ultrasonic sensor 10, after the cushion member 20 is engaged with the case 12, the lead wires 42a and 42b can be soldered to the electrodes 38a and 38b on the substrate 34 from the opening portion 32 of the cushion member 20. It is therefore easy to connect the piezoelectric element 16 to the pin terminals 36a and 36b, and the number of assembly steps is reduced.

In the ultrasonic sensor 10, only the pin terminals 36a and 36b project from the top surface of the cushion member 20, that is, the holding portion 26 of the cushion member 20 used to hold the pin terminals 36a and 36b has a relatively small area. Thus, a relatively large space can be provided for the opening portion 32 into which the material of the elastic resin 44, such as foamable silicon, is injected. Therefore, the filling operation of the material is facilitated. Accordingly, the occurrence of unwanted bubbles in the elastic resin 44 is prevented, and stable reverberation characteristics are achieved.

In the ultrasonic sensor 10, the elastic resin 44 is also deposited on the substrate 34 and around the holding portion 26 by which the substrate 34 and the pin terminals 36a and 36b are held. Thus, the holding portion 26, the substrate 34, and the pin terminals 36a and 36b are reinforced by the elastic resin 44.

Figure 9:
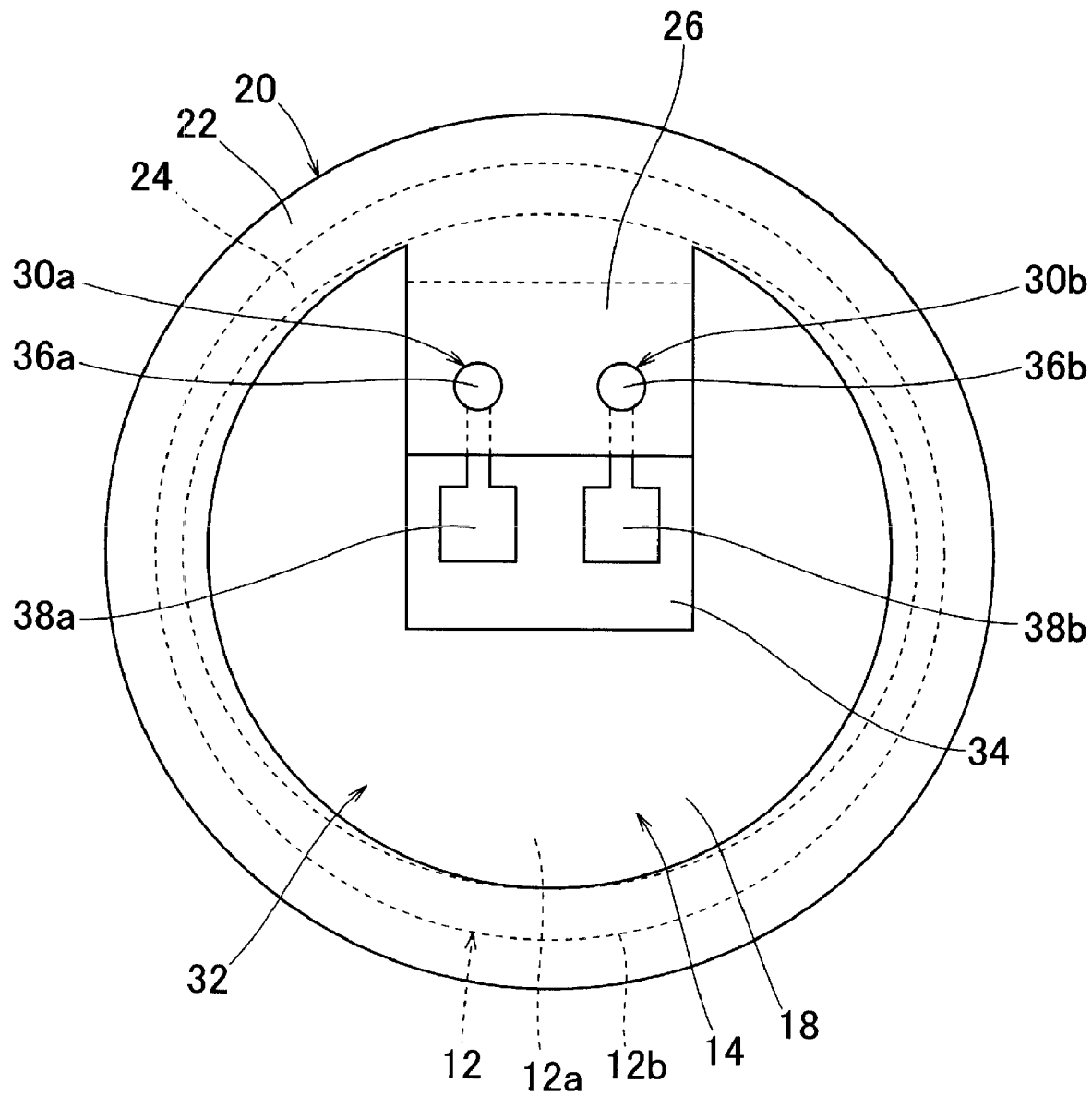
FIG. 9 is a schematic plan view showing an ultrasonic sensor according to another preferred embodiment of the present invention.

FIG. 9 is a schematic plan view showing an ultrasonic sensor according to another preferred embodiment of the present invention. In an ultrasonic sensor 10 shown in FIG. 9, compared to the ultrasonic sensor 10 shown in FIG. 1, the length of the holding portion 26 of the cushion member 20 is reduced. This allows the pin terminals 36a and 36b to be located between the center portion of the cushion member 20 and the attachment portion 22, thereby increasing the size of the opening portion 32 of the cushion member 20.

Figure 10:
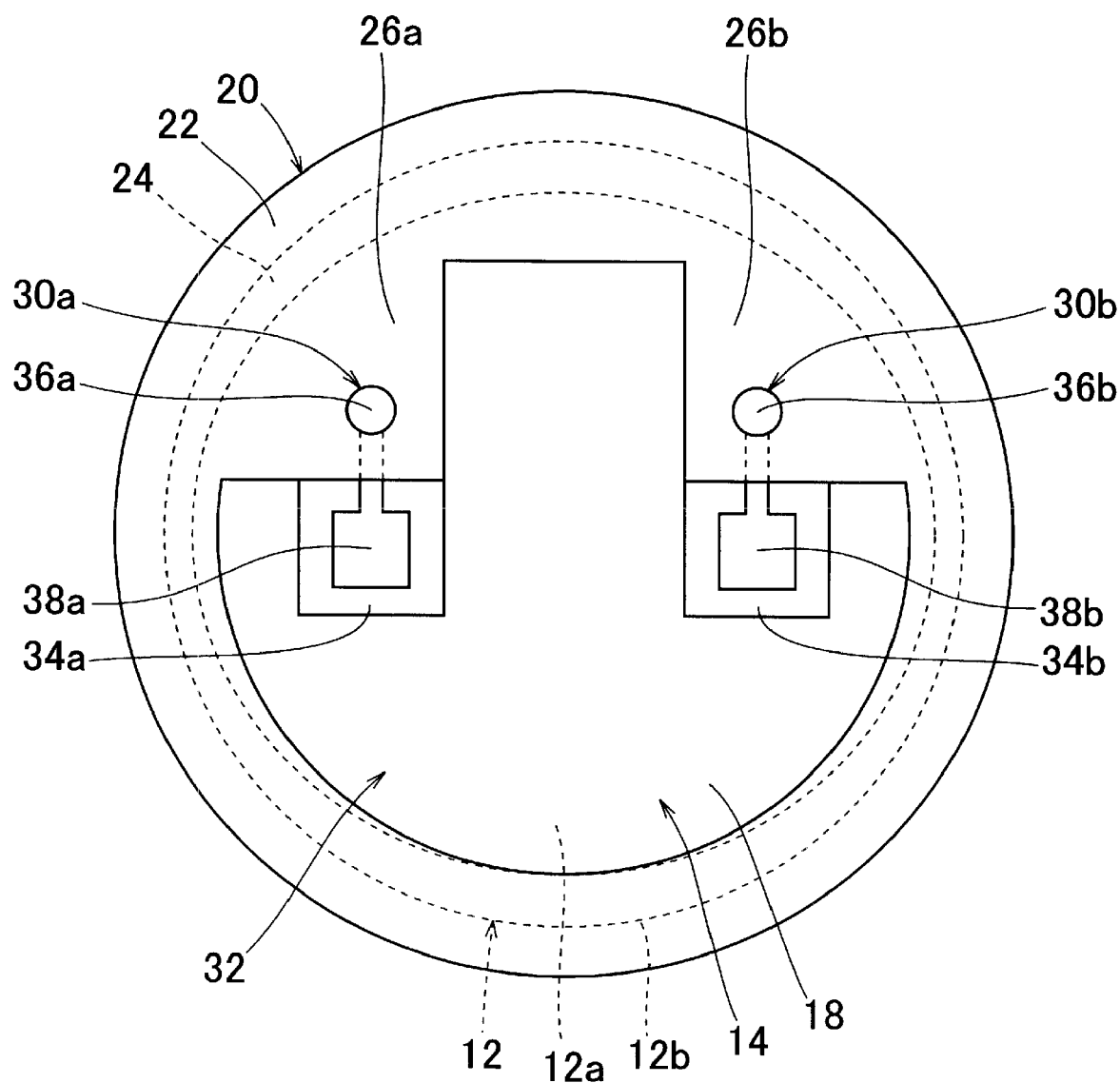
FIG. 10 is a schematic plan view showing an ultrasonic sensor according to another preferred embodiment of the present invention.

FIG. 10 is a schematic plan view showing an ultrasonic sensor according to another preferred embodiment of the present invention. In an ultrasonic sensor 10 shown in FIG. 10, unlike the ultrasonic sensor 10 shown in FIG. 9, the cushion member 20 includes two segmented holding portions 26a and 26b, instead of the single holding portion 26, and two substrates 34a and 34b into which the single substrate 34 is divided are provided. In addition, the opening portion 32 of the cushion member 20 preferably has a substantially T shaped configuration.

The ultrasonic sensor 10 shown in FIG. 9 and the ultrasonic sensor 10 shown in FIG. 10 also achieve advantages similar to those of the ultrasonic sensor 10 shown in FIG. 1.

In addition, in the ultrasonic sensor 10 shown in FIG. 9 and the ultrasonic sensor 10 shown in FIG. 10, the opening portion 32 of the cushion member 20 has larger size than that of the ultrasonic sensor 10 shown in FIG. 1. This makes it easier to electrically connect the electrodes 38a and 38b and to fill the material of the elastic resin 44.

Figure 11:
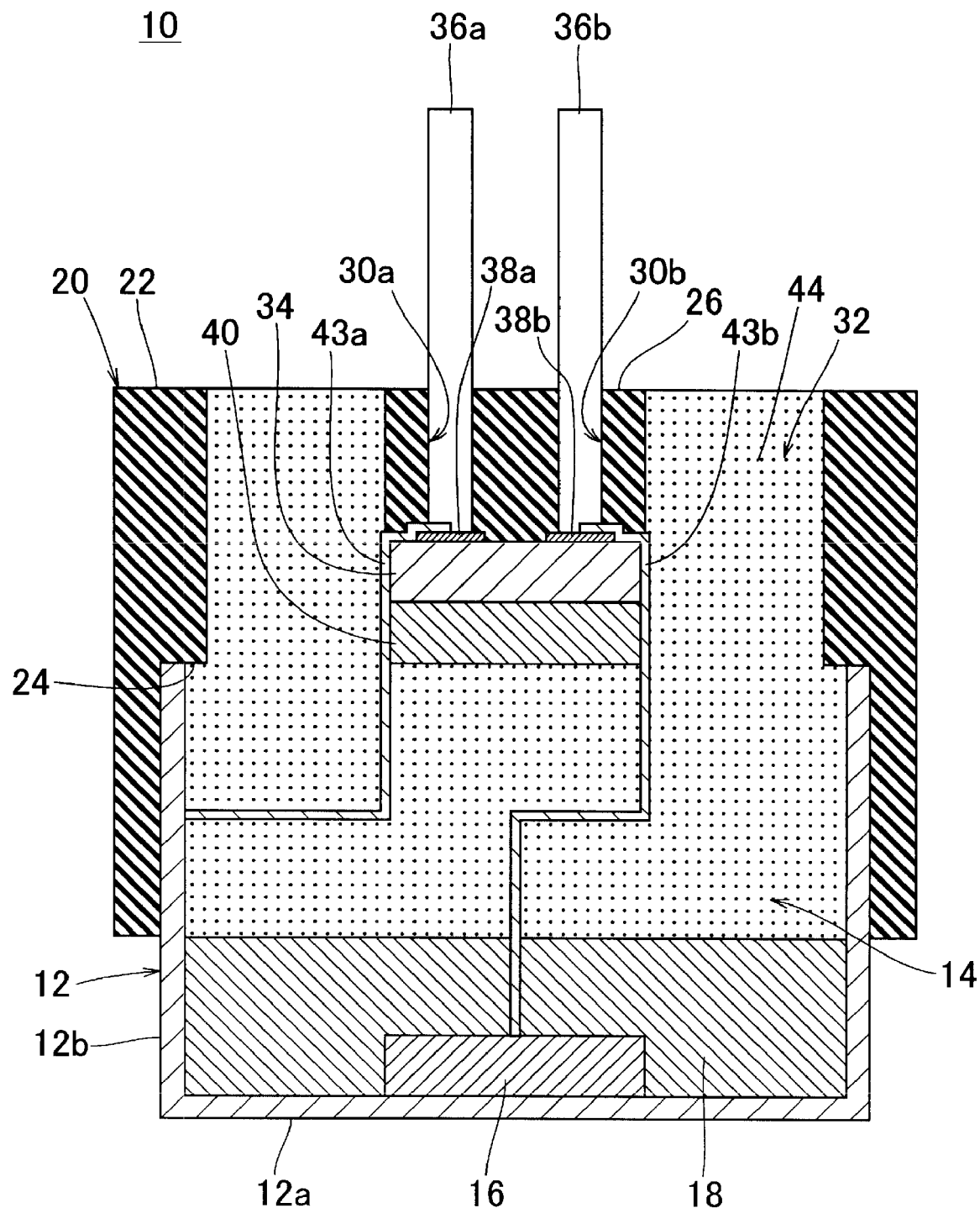
FIG. 11 is a schematic front view showing an ultrasonic sensor according to another preferred embodiment of the present invention.

FIG. 11 is a schematic front view showing an ultrasonic sensor according to another preferred embodiment of the present invention. In an ultrasonic sensor 10 shown in FIG. 11, unlike the ultrasonic sensor 10 shown in FIG. 1, strip-shaped lead ribbons 43a and 43b produced by press-molding a metal plate preferably are provided as the connection members, instead of the line-shaped lead wires 42a and 42b made of polyurethane copper wires.

The ultrasonic sensor 10 shown in FIG. 11 also achieves advantages similar to those of the ultrasonic sensors 10 described above.

Figure 12:
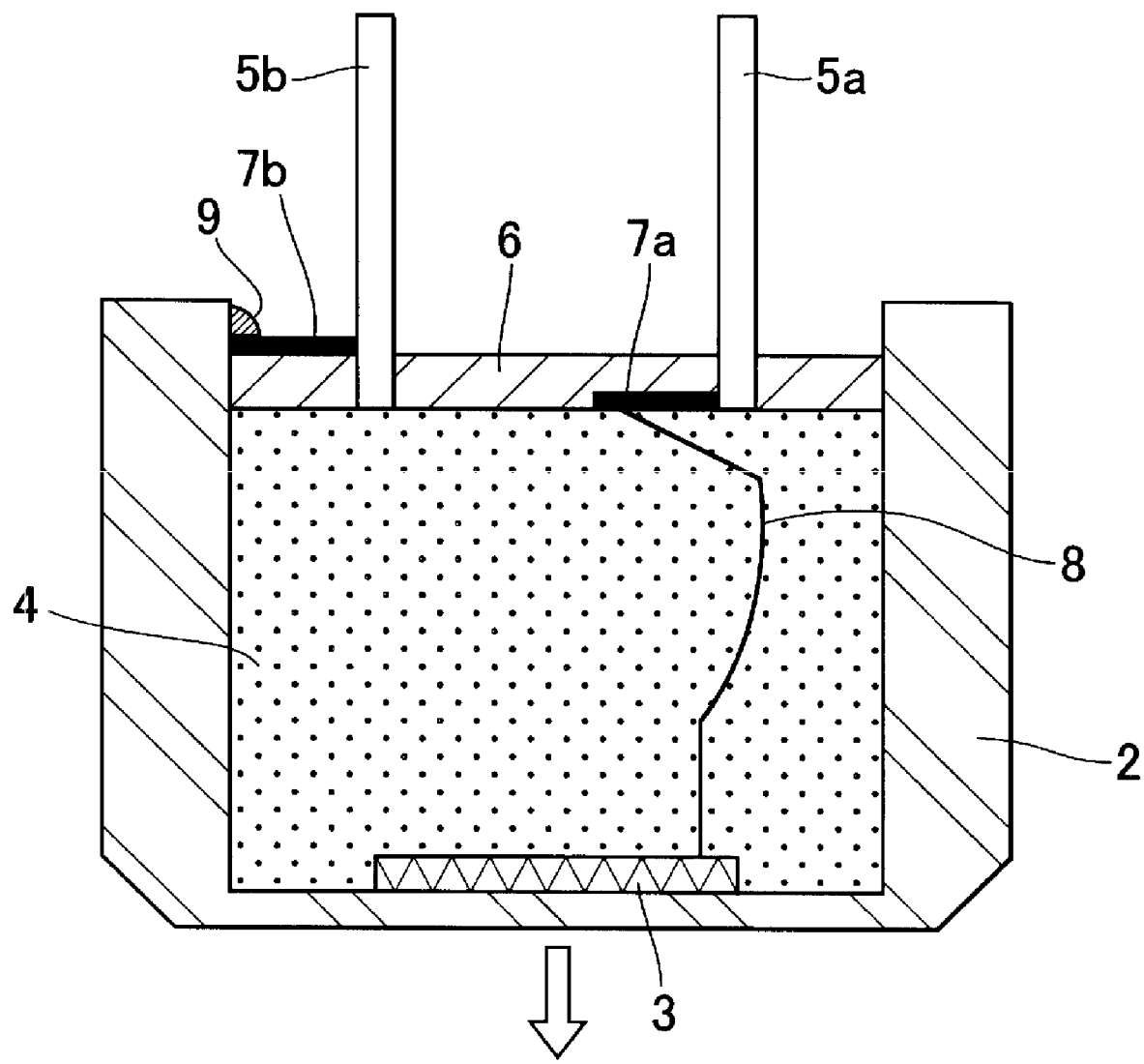
FIG. 12 is a schematic diagram showing an ultrasonic sensor of the related art.
Figure 13:
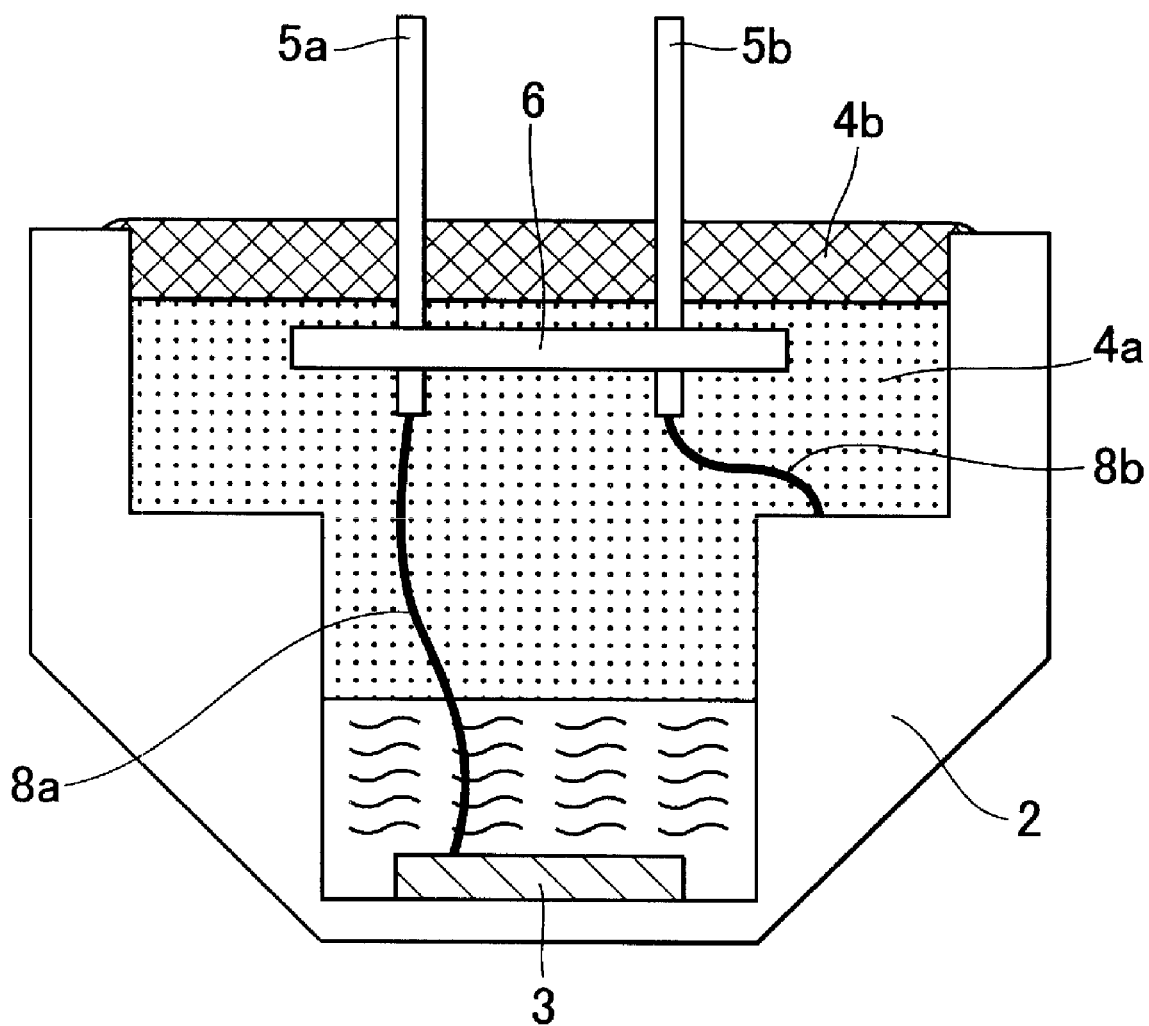
FIG. 13 is a schematic diagram showing another ultrasonic sensor of the related art.

In the ultrasonic sensors 1 of the related art shown in FIGS. 12 and 13, the wire 8 and the lead wires 8a and 8b which are arranged in a line shape are used, and it is difficult to use strip-shaped lead ribbons. In contrast, in the ultrasonic sensor 10 shown in FIG. 11, due to the wiring provided from the opening portion 32 of the cushion member 20 to the electrodes 38a and 38b on the substrate 34, it is possible to use the strip-shaped lead ribbons 43a and 43b. The wiring can be provided by an automatic machine and the number of automatic wiring options can be increased.

In the foregoing ultrasonic sensors, the portions are specified by specific size, shape, arrangement, material, and number. In preferred embodiments of the present invention, these parameters may be changed as desired.

An ultrasonic sensor according to various preferred embodiments of the present invention is preferably used, for example, for a back-up sensor or other suitable sensor on an automobile.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An ultrasonic sensor comprising:
   a case having a substantially cylindrical shape with a bottom surface;
   a piezoelectric element provided on an inner side of the bottom surface of the case;
   a cushion member engaged with an outer side portion of an opening of the case;
   a substrate engaged with the cushion member and secured by the cushion member, the substrate having a terminal fixed thereto;
   an electrode provided on the substrate and electrically connected to the terminal; and
   an opening portion provided in a top surface of the cushion member and arranged to communicate with an inside of the case and the electrode on the substrate; wherein
   the cushion member includes at least one through-hole arranged to receive therein the terminal fixed to the substrate; and
   the cushion is made of rubber.

2. The ultrasonic sensor according to claim 1, further comprising:
   a connection member electrically connected to the piezoelectric element, extending out from the opening portion, and electrically connected to the electrode on the substrate; and
   a filler disposed inside of the case.

3. The ultrasonic sensor according to claim 1, wherein the cushion member and the substrate are engaged to define a cantilever structure, and the opening portion is provided around the cantilever structure.

4. The ultrasonic sensor according to claim 1, wherein the terminal is inserted into the at least one through-hole so that the substrate having the terminal fixed thereto is secured by the cushion member.

5. The ultrasonic sensor according to claim 1, further comprising a sound-absorbing member attached to the electrode via an adhesive.

6. The ultrasonic sensor according to claim 5, wherein the sound-absorbing member is made of felt.

7. The ultrasonic sensor according to claim 1, wherein
   the cushion member includes a substantially cylindrical attachment portion having an upper portion and a lower portion;
   the upper portion having an inner diameter that is less than a diameter of the lower portion;
   the diameter of the lower portion is substantially the same as an outer diameter of the case;
   the lower portion being arranged to surround the case portion.

8. The ultrasonic sensor according to claim 1, wherein the inside of the case has a substantially elliptical shape.

9. The ultrasonic sensor according to claim 1, further comprising a sound-absorbing member having substantially the same shape as the substrate and being attached to a lower surface of the substrate.

10. The ultrasonic sensor according to claim 1, further comprising a lead wire having one end connected to the electrode provided on the substrate and another end connected to the piezoelectric element.

11. The ultrasonic sensor according to claim 1, further comprising a lead wire having one end connected to the electrode provided on the substrate and another end connected to the case.

12. The ultrasonic sensor according to claim 1, further comprising a strip-shaped lead ribbon having one end connected to the electrode provided on the substrate and another end connected to the piezoelectric element.

13. The ultrasonic sensor according to claim 1, further comprising a strip-shaped lead ribbon having one end connected to the electrode provided on the substrate and another end connected to the case.

* * * * *